W. J. GILLER.
EVAPORATOR.
APPLICATION FILED MAR. 10, 1916.

1,215,140.

Patented Feb. 6, 1917.

WITNESSES

INVENTOR
W. J. Giller
BY
ATTORNEYS

UNITED STATES PATENT OFFICE.

WALTER JOHN GILLER, OF WARSAW, ILLINOIS.

EVAPORATOR.

1,215,140.                Specification of Letters Patent.          Patented Feb. 6, 1917.

Application filed March 10, 1916.   Serial No. 83,316.

*To all whom it may concern:*

Be it known that I, WALTER J. GILLER, a citizen of the United States, and a resident of Warsaw, in the county of Hancock and State of Illinois, have invented a new and Improved Evaporator, of which the following is a full, clear, and exact description.

My invention relates to an evaporator whereby liquids may be rapidly evaporated, allowing the vapors therefrom to escape into the open air, or to be condensed by any suitable means.

The object of the invention is to provide a simple, inexpensive and efficient evaporator which is particularly adapted for the rapid concentration of a solution; or the removal, by evaporation, of excess water, or alcohol, or of both alcohol and water as in the case of beer or wine.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 2:
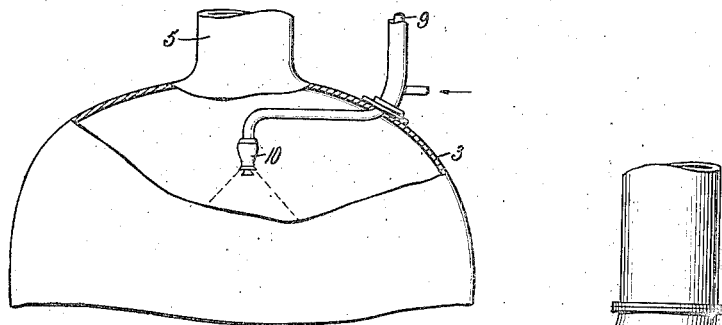
Figure 1:
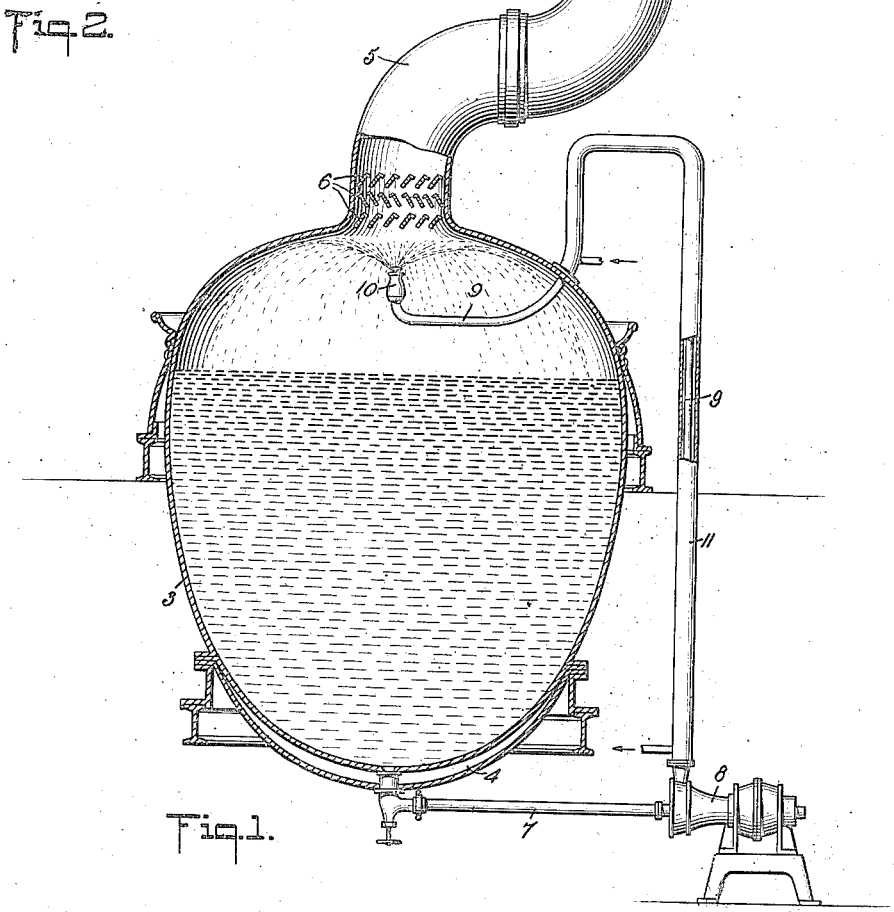

Figure 1 is an elevation of the evaporator, the liquid container or kettle being shown in section, and part of the steam jacket about the delivery conduit also being in section to show the details of construction; and Fig. 2 is a fragmentary elevation of a kettle partly in section to show the spray nozzle in a different position.

Referring to the drawings, 3 is the container or kettle for boiling liquids. It has preferably a steam jacket 4 at the bottom for supplying heat to the kettle to boil the liquid therein but any other suitable means may be used. At the top the kettle has a flue or vent 5 for exhausting the vapors generated in the kettle. Rows of baffle plates 6 are provided in the vent at the top of the kettle to prevent liquid particles from being carried away by the vapors. It will be noted that the rows of baffles are disposed angularly to each other to form a sinuous path or passage for the vapors passing from the kettle to the vent.

A conduit 7 extends from the bottom of the kettle to an inlet end of a pump 8, the delivery conduit 9 of which pump leads to the top of and into the kettle at a point above the highest possible liquid level within the kettle. The conduit 9 within the kettle terminates with a multiple nozzle or nozzles 10 to break up the liquid into fine particles. The conduit 9 is preferably surrounded with a live-steam jacket 11 to preheat the liquid circulating therethrough to the boiling point.

The breaking up of a solution into fine particles by the spray nozzle causes a slight reduction in temperature, which will cause a condensation of the parts of the solution which have a higher boiling point, thus the vapors of the lighter constituents of the solution will escape through the vent, while the other vapors will be retained in the kettle.

The vent 5 may be connected to a vacuum pump so as to cause the boiling of the liquid in the kettle under a diminished pressure.

I claim:

1. An evaporator of the class described comprising a kettle for boiling liquids, a pump, a conduit from the kettle bottom to the pump inlet, a conduit from the pump outlet to the top of the kettle, a nozzle on said conduit within the kettle for breaking up the liquid into a finely divided spray, means for carrying off the vapors from the kettle, and means for preheating the liquid in the conduit from the pump outlet to the kettle.

2. An evaporator of the class described comprising a kettle for boiling liquids having a vapor exhaust at the top thereof, baffle plates in said exhaust, a pump adapted to draw liquid from the kettle and discharge the same into the kettle above the liquid level of the kettle, means for breaking up the discharged liquid within the kettle into a finely divided spray, and means for preheating the liquid on its discharge from the pump to the kettle.

3. An evaporator of the class described comprising a kettle for boiling liquids having a vapor exhaust at the top thereof, angularly disposed rows of baffle plates in the exhaust at the kettle, a pump, a conduit from the bottom of the kettle to the inlet of the pump, a conduit from the outlet of the pump into the kettle at a point above the liquid level of the kettle, a multiple-spray nozzle on said conduit for breaking up the liquid into finely divided sprays, and a steam jacket on the conduit from the outlet of the pump to the kettle for preheating the liquid flowing through the conduit.

In testimony whereof I have signed my name to this specification in the presence of two subscribing witnesses.

WALTER JOHN GILLER.

Witnesses:
J. M. HUNGATT,
HENRY ZOBEL.